United States Patent [19]

Oakes

[11] 4,242,050
[45] Dec. 30, 1980

[54] WINDMILL POWER GENERATOR

[76] Inventor: Richard M. Oakes, Box C, Bernice, Okla. 74331

[21] Appl. No.: 121,428

[22] Filed: Feb. 14, 1980

[51] Int. Cl.³ .............................................. F03D 11/02
[52] U.S. Cl. .................................. 416/170 R; 290/55; 74/136
[58] Field of Search ....................... 290/55, 44; 74/136, 74/137, 140, 138, 139, 126; 192/41 R; 416/169, 170

[56] References Cited

U.S. PATENT DOCUMENTS

| 282,122 | 7/1883 | Schramm | 416/170 |
|---|---|---|---|
| 909,764 | 1/1909 | Dawes | 416/169 |
| 1,368,696 | 2/1921 | Butterfield | 74/136 |
| 4,110,631 | 8/1978 | Salter | 290/55 |
| 4,159,427 | 6/1979 | Wiedemann | 290/55 |

Primary Examiner—J. V. Truhe
Assistant Examiner—Don. Rebsch
Attorney, Agent, or Firm—James H. Chafin

[57] ABSTRACT

A windmill powered generator having one or a plurality of wind operated motor units, each being operably connected to a single power drive shaft to effect rotation of said drive shaft regardless of the rotational direction of the wind operated rotary units. Each rotary unit is provided with a crank shaft having one or more crank arms carried thereby, the drive shaft having one frictional hub associated with each crank arm. A drive belt extends from each crank arm around its associated hub and is yieldably secured to either the frame or to the end of another drive belt attached to an oppositely oriented crank arm whereby movement of the crank arm in a direction away from the drive shaft increases the friction between the drive belt and the frictional hub causing rotation of the drive shaft and whereby movement of the crank arm in a direction toward the drive shaft decreases the friction between the drive belt and the frictional hub thereby allowing the belt to slip about the frictional hub.

12 Claims, 7 Drawing Figures

WINDMILL POWER GENERATOR

BACKGROUND OF THE INVENTION

1. Field of the Invention

The present invention relates to rotary power generator devices and more particularly, but not by way of limitation, to a windmill generator device whereby the rotary motion of the wind operated unit is converted into rotary motion of a power drive shaft in a single direction regardless of the direction of rotation of the wind operated rotary unit.

2. History of the Prior Art

For many years, windmills have been used for the generation of electricity, the pumping of water from wells and for pumping of irrigation waters and the like. Windmills in Holland have been used as grist mills and in essence man has been attempting to harness the power of the wind for useful purposes, but with limited success.

Typically, in the generation of electricity, a generator is secured to a windmill on a rotary pedestal so that the windmill may be automatically rotated to follow the direction of the wind.

However, one of the problems in utilizing a windmill for power generation is that one windmill is usually insufficient to provide the necessary torque to operate a generator of any size. One attempted solution of this problem has been the construction of windmills with blades up to fifty feet in length, which requires very costly structure for their support thereby rendering such units economically unfeasible.

Another solution is to secure windmills together, each having a small generator, which are electrically connected to produce the desired electrical current. This requires either electrically aligning the phase of each generator or rectifying the electrical current of each generator before combining or ganging the output thereof.

The problems are further compounded by the fact that several windmills, even located in the same general vicinity, will rotate at different speeds. Hence, the use of windmills for the generation of power other than on a small scale has met with only limited success.

SUMMARY OF THE INVENTION

The present invention provides a windmill generator system which permits several windmill units to be operably connected to a single drive shaft in a manner whereby the drive shaft will be acted upon by each windmill to produce torque in a single direction regardless of which direction the windmill is turning or the relative speed of rotation.

Each windmill unit is provided with a crankshaft which may be either directly connected to the windmill blade unit or may be connected thereto through gearing means, each said crankshaft being provided with at least one crank arm which is spaced above the power drive shaft that is to be rotated.

A flexible rope or drive belt member is rotatably connected to the outer end of each crank arm. This flexible drive belt is then passed around one side of a frictional hub which may be in the form of a sheave member which is rigidly carried by the drive shaft whereby the frictional hub or sheave member rotates with the drive shaft. The opposite end of the flexible line may then be provided with a tension spring or yieldable member which, in turn, is rigidly attached to a frame member.

Therefore, when the crank arm is traveling upwardly or generally away from the drive shaft, tension applied to the flexible line tightens the flexible line against the sheave member thereby increasing the frictional force between the drive belt and the sheave member. Continued upward travel of the crank arm thereby causes the drive shaft to rotate.

When the crank arm passes over the top and starts its downward travel toward the drive shaft, there is still tension in the flexible line but that tension is relaxed by the downward movement of the crank arm and its associated drive belt. The friction then between the flexible line and the sheave member is greatly reduced and the drive belt is simply slipped in the sheave member until the crank arm again begins its upward movement.

Several such windmills may be attached to a single drive shaft whereby torque may be transferred from each of the windmills to the drive shaft.

An improved variation in the windmill device results when each windmill has a rotatable crankshaft having at least a pair of oppositely oriented crank arms. Each crank arm has a flexible line or drive belt and each crank arm has an associated frictional hub or sheave member attached to the drive shaft. The flexible line or drive belt then from each crank arm is passed around its respective frictional hub member and then may be connected to the frame through a tension spring as hereinbefore described or may be connected to opposite ends of a single tension spring. In this manner where one of the crank arms is moving upwardly, it is imparting rotation to the drive shaft through one of the frictional hub members while the second crank arm is simultaneously moving downwardly, its flexible line slipping through the other hub member and vice versa.

In fact, the crankshaft, which rotates with the blades of the wind operated unit, may be provided with a plurality of crank arms having spaced orientation so that at least one of the crank arms is moving upwardly at any given time thereby applying torque to the drive shaft.

As hereinbefore stated, it can be seen that several such windmill units may be attached to the single drive shaft to impart rotation thereto. It is pointed out that when the drive shaft is not loaded, its speed will be determined by the fastest moving windmill. However, when a torque load is applied to the drive shaft such as the drive shaft operating a pump or a loaded electrical generator, the drive shaft will tend to turn at a slower speed whereby it will pick up torque from each of the windmills.

In fact, as a greater work load is applied to the drive shaft, thereby tending to slow the drive shaft, the torques from several windmill operating units will be more effectively added.

One embodiment of the power generator system would be to connect the single drive shaft to a pivotal pedestal with each of the wind operated members being also secured to this pedestal whereby the entire pedestal might be pivoted over a few degrees to more effectively align the wind operated units with the wind direction.

One embodiment of the invention is to provide pivotal mounting of each wind operated unit about a horizontal axis so that during wind storms or damaging weather conditions, the windmill units may be rotated horizontally to prevent damage to the windmill unit.

It has further been determined that when the drive belt is under tension thereby imparting rotation to the drive shaft, there is very little relative movement between the frictional hub and the belt member which causes very little wear on the belt member itself. Oppositely when the crank arm is moving toward the drive shaft, the friction is so greatly reduced that again, there is very little wear between the frictional hub and the drive belt thereby providing a more reliable system in that there is an extended time between belt changes and correspondingly between failures of the belt due to wear.

DESCRIPTION OF THE DRAWINGS

Other and further advantageous features of the present invention will hereinafter more fully appear in connection with a detailed description of the drawings in which.

DESCRIPTION OF THE PREFERRED EMBODIMENT

Figure 1:
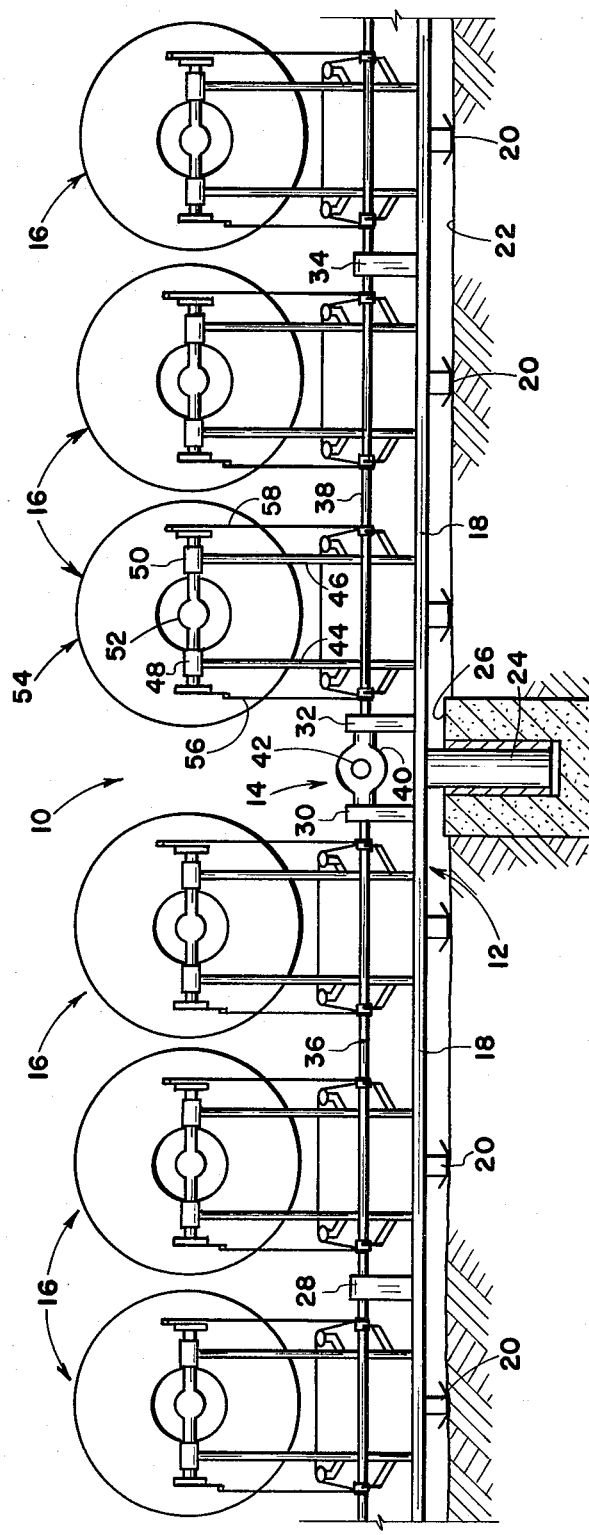
FIG. 1 is a front elevational view, partially in section, of a windmill power generator system embodying the present invention.

Referring to the drawings in detail, reference character 10 indicates a windmill power generation system which generally comprises a movable frame assembly 12, a power drive shaft assembly 14 and a plurality of wind operated rotary members 16, all mounted on the frame 12.

The frame assembly 12 generally comprises an elongated frame base member 18 which may be of I-beam construction, the length of which is supported by a plurality of skid members 20 which rests on top of a ground surface indicated by reference character 22. It is noted that skid members 20 could be rollers, wheels or any other movable supporting means. The center of the frame base member 18 is provided with a downwardly extending pivot pin 24 which is journalled within a housing or foundation member 26 for rotation whereby the entire frame assembly 12 may be pivoted in a horizontal plane about the pivot pin 24.

A plurality of spaced aligned pillow blocks 28, 30, 32 and 34 are secured to the upper surface of the base frame 18. A first elongated drive shaft member 36 is journalled in and supported by the pillow blocks 28 and 30 while a second drive shaft member 38 is journalled in and supported by pillow blocks 32 and 34.

The inner ends of the drive shafts 36 and 38 are operably connected to a differential gear member 40 which may be similar to the differential gear of an automobile, the differential 40 having an output rotary shaft 42 which extends outwardly at a right angle to the longitudinal axes of the drive shaft members 36 and 38 for connecting to a power generator, pump or the like (not shown).

It can be seen that if the drive shaft members 36 and 38 are rotated in a common direction, even at different speeds, they will effect a rotation of the output shaft 42.

Each wind operated rotary unit 16 generally comprises a vertically extending pair of frame members 44 and 46, the upper ends thereof having a pair of aligned sleeve members 48 and 50, respectively, for pivotally supporting a crankshaft assembly generally indicated by reference character 52. Operably connected to the crankshaft assembly 52 is a rotary blade assembly 54 for imparting rotation to the crankshaft assembly 52. Each end of the crankshaft assembly 52 is then operably connected to the drive shaft by means of flexible lines 56 and 58 in a manner that will be hereinafter set forth.

The blade assembly 54 may constitute practically any windmill blade pattern to most efficiently convert the wind into rotary motion. Applicant has had acceptable success with the assembly shown in the drawings, which consists of a rotary shaft member 60 which is connected to a hub assembly 62 which may be converted bicycle wheels. An outer circular rim 64 then is secured to the hub 62 by way of a plurality of blades 66 which are set at an appropriate pitch with respect to the general plane of the rotary unit 54.

The shaft 62 is then journalled into a differential gear box 68 which may be a converted automobile rearend differential. The differential further comprises a pair of outwardly extending oppositely disposed sleeve members 70 and 72 having crankshaft segments 74 and 76 journalled therein whereby rotation of the input shaft 60 causes simultaneous rotation of the crankshaft segments 74 and 76.

Figure 3:
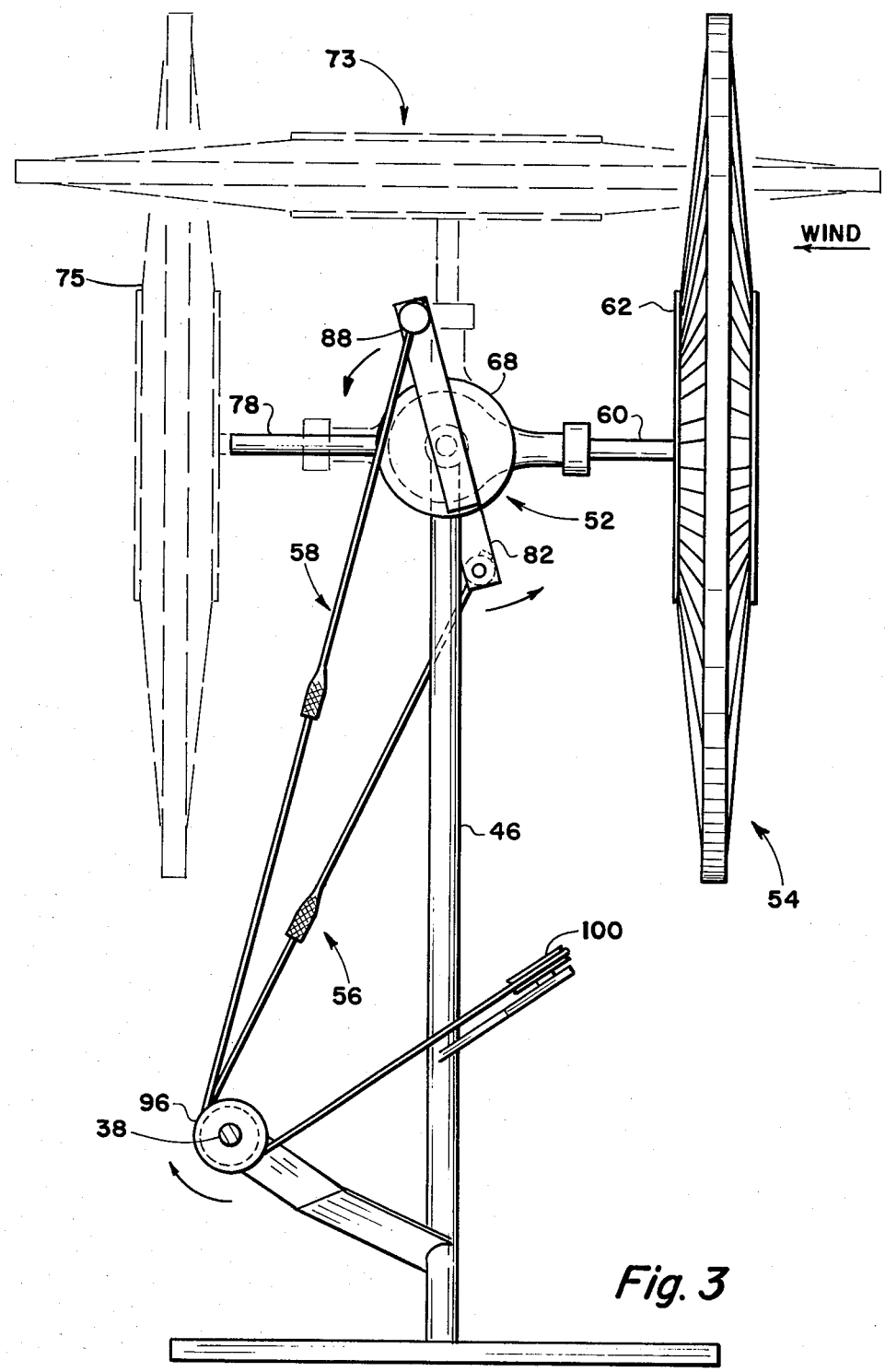
FIG. 3 is a side elevational view of the unit of FIG. 2.

The sleeve members 70 and 72 are in turn journalled in and supported by the sleeve members 48 and 50 whereby the entire blade assembly 54 may be rotated by the horizontal axis through approximately 180° as shown in FIG. 3. The blade assembly 54 may be rotated to a substantially horizontal position as shown by the dashed lines at 73 or in an oppositely disposed vertical position as shown by the dashed lines at 76. The vertical overhead position shown by 73 is extremely helpful in the case of wind storms where it is desired to protect the blade assembly from strong horizontal winds. By storing the blade assembly in the position shown in 73, little if any wind damage is sustained by the blade assembly.

In order to assist in positioning the blade assembly in its desired orientation, an elongated handle member 78 is secured to sleeve member 72 and extends outwardly therefrom. In order to lock the assembly in its desired orientation there may be provided a set screw and handle member 80 for interacting between the outer sleeve member 50 and the crankshaft sleeve member 72.

A first offset crank arm 82 is secured to the outer end of the crankshaft segment 74, with the other end of said crank arm being provided with an outwardly extending horizontal pin member 84 which is provided with a slip collar 86. Likewise, the outer end of the crankshaft segment 76 is provided with a second crank arm 88, the outer end thereof being provided with a horizontal pin member 90 and associated slip collar 92.

Figure 2:
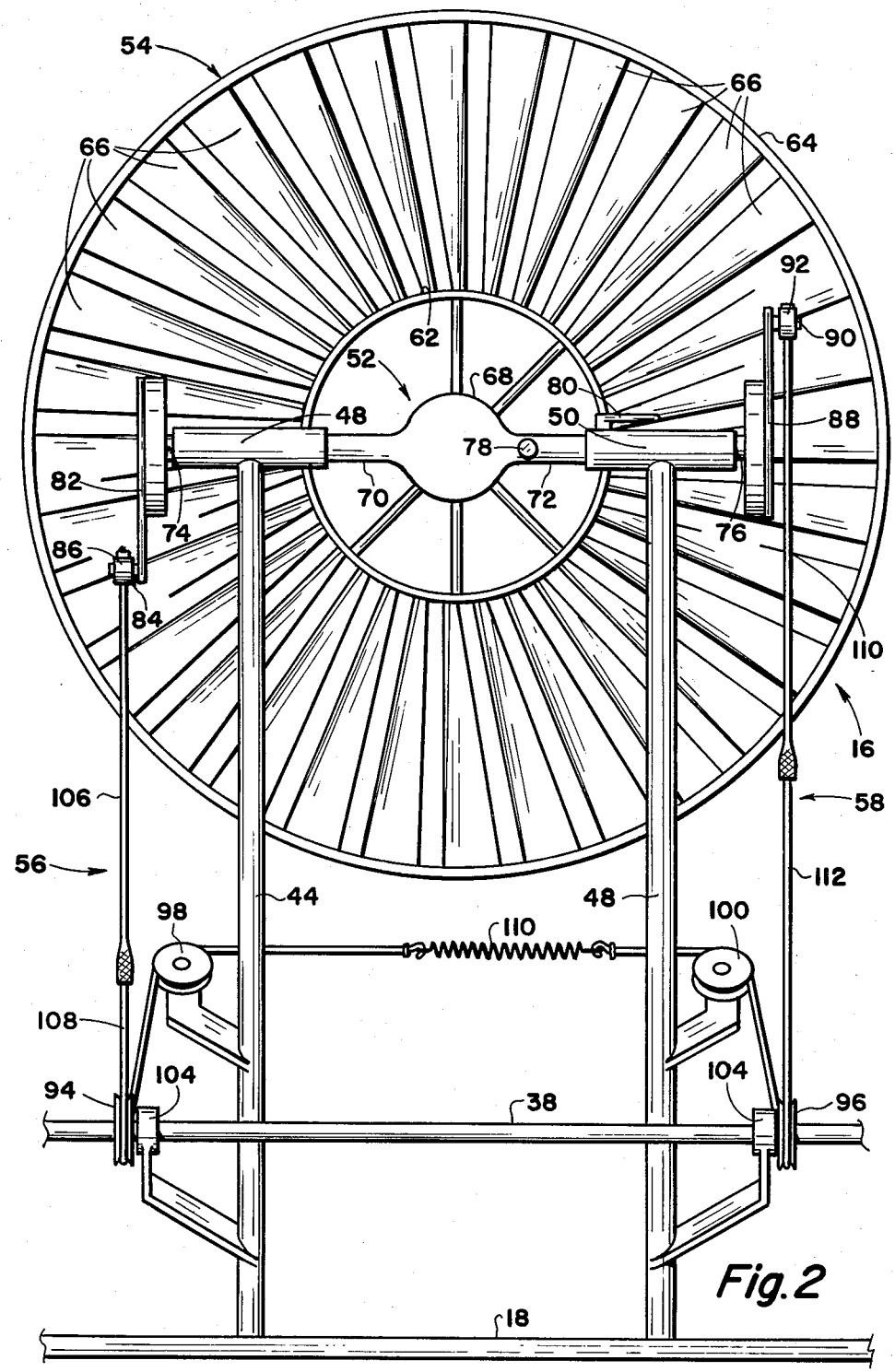
FIG. 2 is a front elevational view of one of the wind operated units of the system of FIG. 1 in a first position.

A first drive sheath 94 is rigidly secured to the drive shaft 38 and is positioned adjacent the first crank arm 82 and spaced therefrom as shown in FIG. 2. A second drive sheath 96 is rigidly attached to the drive shaft 38 for rotation therewith and is positioned in a like manner adjacent and spaced from the crank arm 88. A pair of spaced idler pulleys 98 and 100 are carried by the upright frame members 44 and 46, respectively.

It is pointed out, as shown in FIGS. 2 and 3 of the drawings, further journal support may be provided for the drive shaft 38 by means of sleeve members 102 and 104 which may be carried by the upright frame members 44 and 46 or may take on the form of pillow blocks and be attached directly to the frame base 18.

The flexible line 56 is made up of a first nylon woven rope segment 106 which has one end thereof attached to the slip collar 86, the opposite end being attached to one end of a V-belt segment 108. The V-belt segment 108 then is passed around one side of the drive sheath 94, around the idler pulley 98 and is attached to one end of a yieldable tension spring 110. It is noted that this spring 110 may be in the form of a coil spring, elastic cord or the like.

Likewise, the flexible line 58 is made up of a second nylon woven rope 110 which has one end connected to the slip collar 92 with the opposite end connected to one end of a V-belt segment 112. The V-belt 112 then is passed around the drive sheath 96 on the same side as that of the V-belt 108. It is then passed around the outer pulley 100 and is connected to the opposite end of the tension spring 110.

In operation, and referring specifically to FIG. 3 of the drawings, the entire frame assembly 12 may be pivoted so that the wind is approaching the blade assembly 54 at a right angle to the plane thereof thereby effecting rotation of the shaft 60. Rotation of the shaft 60 then through the differential gear box 68 will effect rotation of the crankshaft segments 74 and 76 to produce rotation of the crank arms 82 and 88 in a single direction. For purposes of this description, consider the direction of rotation of the crankshaft as being counter-clockwise as shown in FIG. 3 of the drawings. It is noted at this point that the tension spring 110 will keep tension in both flexible lines 56 and 58.

As the crank arm 82 rotates upwardly and away from the drive shaft 38, the tension in flexible line 56 is increased which creates an increased normal force on the drive sheath 94 thereby increasing the frictional force between the flexible line 56 and the drive sheath 94 which causes rotation of the drive sheath and its associated drive shaft 38 in a clockwise direction, again as viewed in FIG. 3.

Simultaneously, the crank arm member 88 is moving downwardly toward the drive shaft 38 thereby relieving tension in the line 58 causing the line 58 to slip through the drive sheath 96. During this operation it can be seen that the tension spring 110 will move toward the idler pulley 98.

On the other hand, after the crank arm 88 passes directly between the crankshaft segment 76 and the drive shaft 38, its continued rotation will cause the outer end thereof to move upwardly away from the drive shaft 38. At this point, tension in the line 58 increases thereby causing an increased frictional force between the line 58 and the drive sheath 96 causing the drive sheath again to rotate in a clockwise direction as shown in FIG. 3.

Hence, it can be seen that rather than the rotational movement of the crank arms 82 and 88 causing rotation in a particular direction, it is the movement of the crank arm ends toward and away from the drive shaft that causes rotation of the drive shaft 38. Regardless of which direction the crankshaft segments are rotating, a clockwise rotation will be imparted to the drive shaft 38. Therefore, even if the wind shifted out of the opposite direction from that shown in FIG. 3, no adjustment would have to be made to the blade assembly 54 in order to maintain the drive shaft 38 rotating in a clockwise direction. However, if the wind were to come in the opposite direction, it would be more efficient to rotate the blade assembly 54 180° into the position as shown by the dashed lines 75.

It is further noted that since there is a plurality of wind operated units 16 carried by the frame member 12 and operating on the shaft 38, the speed of the shaft 38 would be relative to the speeds of the individual wind operated units 16. In other words, if the shaft 38 were not loaded and able to freely turn, it would assume a speed corresponding to the fastest turning wind operated unit 16.

However, if a load is applied to the shaft 38 which would tend to slow it down, when it reaches a speed corresponding to the second fastest turning member, the torque applied by that second member will be added to the first member in helping rotate the shaft. Naturally, the more load applied to the shaft 38, the more units 16 would come into play in adding torque. This is also true of the shaft 36 and its associated wind operated units 16. It can further be seen that if a failure of one of the units 16 occurs, so that it ceases to operate, it will not affect the remaining operating units other than a reduction of total torque capability while that particular unit is inoperative.

In order for the flexible line 56 on its power stroke to take up the slack produced by relieving tension in the flexible line 58, and for purposes of balancing the crankshaft, the crank arm 82 should be directed or oriented 180° away from the crank arm 88.

Figure 7:
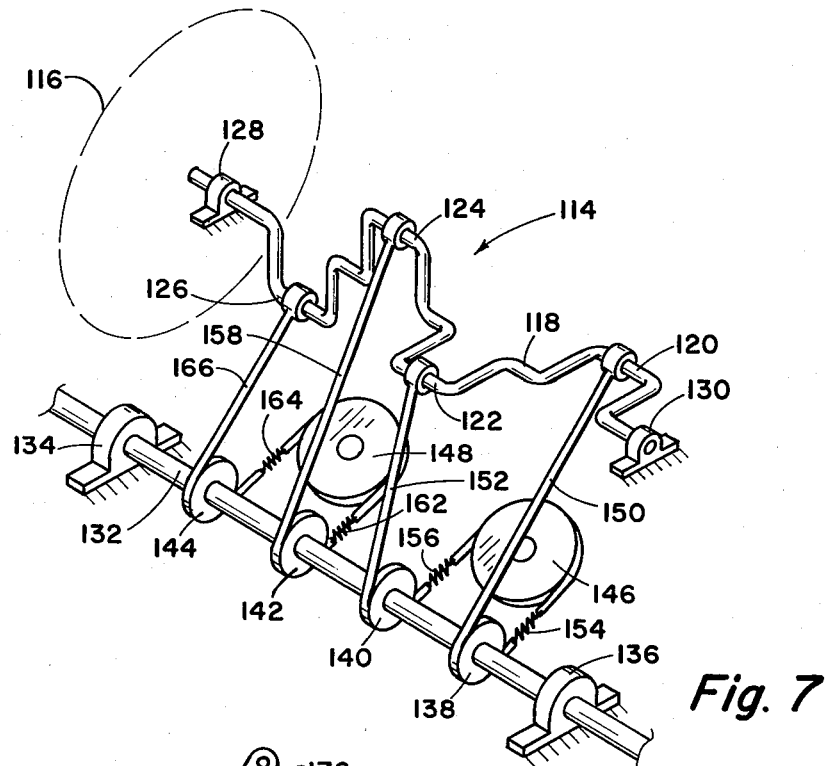
FIG. 7 is a prospective view of an alternate wind operated unit.

As hereinbefore stated, the crankshaft may contain a plurality of crank arms as indicated by the wind generating device of FIG. 7 generally indicated by reference character 114. In this case a rotary blade assembly 116 is provided with a crankshaft 118 having four crank arms 120, 122, 124 and 126. The crankshaft is mounted for rotation by spaced pillow block bearings 128 and 130. A suitable drive shaft 132 is mounted for rotation by suitable pillow blocks 134 and 136. Associated with each crank arm 120, 122, 124 and 126 are drive sheaths 138, 140, 142 and 144, respectively.

An idler pulley 146 is associated with the drive sheaths 138 and 140 while a second idler pulley 148 is associated with sheaths 142 and 144. Crank arms 120 and 122 are oppositely disposed or oriented 180° apart and are operably connected around the idler pulley 146 by flexible lines 150 and 152 and are isolated from the idler pulley by tension spring segments 154 and 156, respectively.

Crank arms 124 and 126 are oriented 180° apart and 90° from the crank arms 120 and 122. Crank arms 124 and 126 are connected around the idler pulley 140 by means of flexible lines 158 and 160 and are isolated from the idler pulley 148 by tension springs 162 and 164, respectively.

It can be seen from the arrangement of the wind operated unit 114 that at least one of the flexible lines 150, 152, 158 or 160 are in a power stroke mode or moving away from the drive shaft at any given time which may result in a smoother more constant rotation of the drive.

It can also be seen that the idler pulleys 146 and 148 and associated tension spring members could be utilized instead of the dual idler pulley arrangement of the wind operated unit 16 hereinbefore described.

Figure 4:
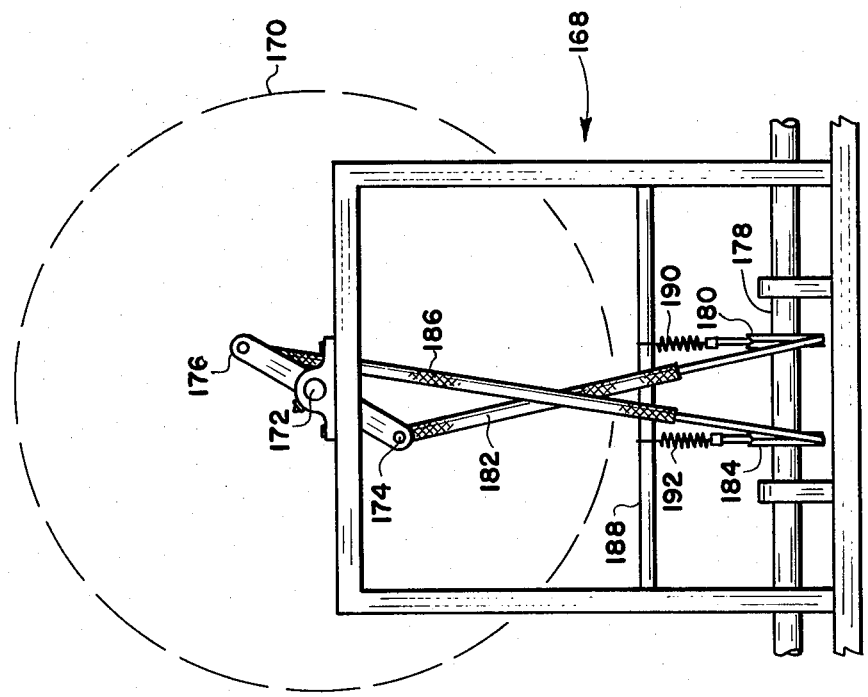
FIG. 4 is a front elevational view of a second embodiment of a wind operated unit.
Figure 5:
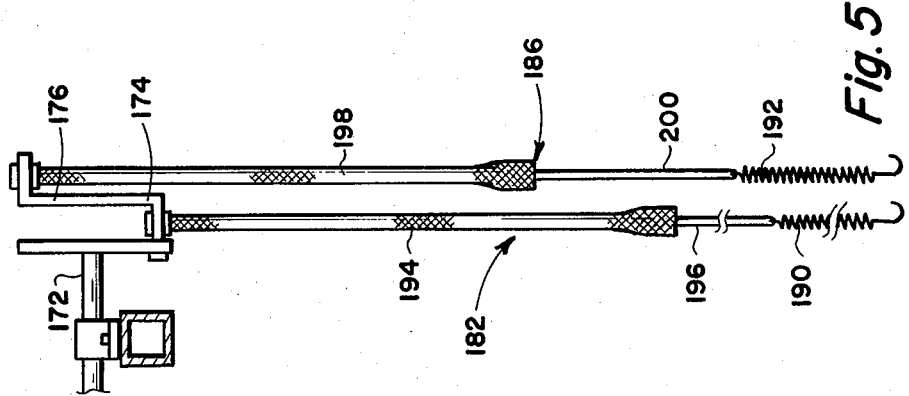
FIG. 5 is a side elevational view of the embodiment of FIG. 4.

Referring now to FIGS. 4 and 5, reference character 168 depicts a wind powered unit having a blade assembly 170 for rotation of a crankshaft 172. The crankshaft 172 is provided with a pair of oppositely disposed crank arms 174 and 176 which are utilized to impart rotation to a drive shaft member 178. The drive shaft member 178 is provided with a first drive sheath 180 which is operably connected to crank arm 174 by a flexible line 182. A second drive sheath 184 is secured to the drive shaft and is operably connected to the crank arm 176 by flexible line 186. The opposite ends of the flexible lines 182 and 186 are connected to a frame member 188 by means of tension springs 190 and 192, respectively. FIG. 5 is a side view of the mechanism of FIG. 4 showing the flexible lines 182 and 186 disconnected from the drive sheaths. The line 182 is made up of a nylon woven rope segment 194, the lower end of which may be spread apart to receive the ends of belt segment 196. When tension is applied the woven members tighten much in the same fashion as a Chinese finger cuff and withstand a great amount of tension while being very easy to disconnect.

Likewise, the flexible line 186 is made up of a woven nylon rope 198 and associated V-belt segment 200. In the embodiment depicted by reference character 168, it is noted that the tension members 190 and 192 must be of sufficient length and elasticity to allow the V-belt segment to be in constant contact with the drive sheaths 180 and 184.

Figure 6:
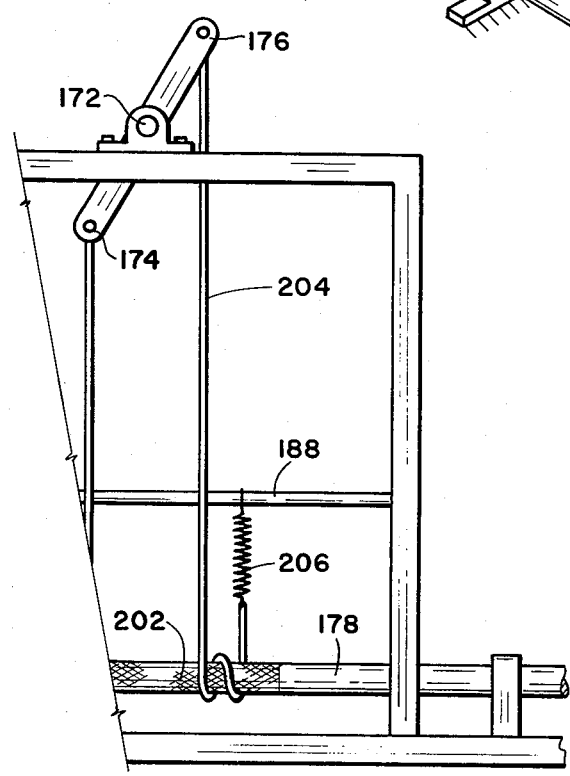
FIG. 6 is a partial view of an alternate friction hub of the device of FIG. 4.

Referring to FIG. 6 of the drawings, reference character 202 indicates a frictional hub member which is either attached around the outer periphery of the drive shaft 178 or may simply be a portion of the drive shaft 178 which has been scored or treated to increase the coefficient of friction between the shaft and the belt. In this case a flexible line indicated by line 204 may simply extend from the crank arm 176 and then be wrapped one or more turns around the frictional hub 202 and then attached to the frame member 188 by means of a suitable tension spring 206. In this arrangement when the crank arm 176 moves upwardly away from the drive shaft 178, the line 204 tightens around the frictional hub 202 thereby greatly increasing the frictional force therebetween which causes rotation of the drive shaft. When the crank arm 176 is in its downward stroke, the tension in flexible line 204 is relaxed, thereby loosening the wraps around the drive shaft allowing the drive shaft to freely slip therein.

In any of the embodiments hereinbefore described, the frictional hub member 202 may be as hereinbefore described or may be in the form of a sheath 180 or 184.

From the foregoing, it is apparent the present invention provides a windmill powered generator system which permits a plurality of wind operated units to impart rotation to a single drive shaft regardless of the velocity of rotation of each individual wind operated unit thereby producing drive power with a high amount of torque. Hence, a single, rather large turbine generator could be operated by that single drive shaft with a plurality of rather small, compact, easily maintainable wind operated units.

Whereas, the present invention has been described in particular relation to the drawings attached hereto other and further modifications apart from those shown or suggested herein may be made within the spirit and scope of the invention.

What is claimed is:

1. A windmill powered generator comprising:

a frame;

a rotary wind operated member;

a crankshaft operably connected to the wind operated member for rotation therewith, a crank arm connected to the crankshaft, the outer end thereof being offset from the rotational axis of the crankshaft;

an elongated rotary power drive shaft spaced from the crankshaft, a frictional hub member connected to the drive shaft for rotation therewith; and an elongated flexible line having a first end operably connected to the outer end of the crank arm, said flexible line being passed around one side of the frictional hub member and including means for yieldably securing the second end of the flexible line;

whereby travel of the crank arm end away from the drive shaft increases the frictional force between the flexible line and the drive shaft to cause rotation of the drive shaft and whereby travel of the crank arm toward the drive shaft decreases the frictional force between the flexible line and the drive shaft allowing the drive shaft and associated frictional hub to slip with respect to the flexible line.

2. A power generator as set forth in claim 1 wherein the crankshaft comprises a horizontally disposed bearing mounted shaft connected directly to the wind operated member.

3. A power generator as set forth in claim 1 and including gear means for operably connecting the crankshaft to the wind operated member.

4. A power generator as set forth in claim 1 and including a second crank arm operably connected to the crankshaft, the outer end of said second crank arm being oriented 180° from that of the first crank arm and including a second frictional hub member secured to the drive shaft and a second flexible line operably connecting the second crank arm to the second frictional hub member and including second means for yieldably securing the second end of the second flexible line member.

5. A power generator as set forth in claim 4 wherein the means for securing the second ends of the flexible line members comprise an elongated yieldable tension segment connected between the frame member and the second end of the line member.

6. A power generator as set forth in claim 4 wherein the means for securing the second ends of the flexible line members comprise at least one idler pulley, the second ends of the first and second flexible lines being attached together with a yieldable tension segment connected therebetween, at least one of said lines being passed over said idler pulley.

7. A power generator as set forth in claim 1 and including at least a second rotary wind operated member and associated crankshaft and crank arm, an additional frictional hub member secured to the drive shaft and a flexible line member operably connecting the rotary wind operated member and associated crank arm to the drive shaft.

8. A windmill powered generator system comprising an elongated frame member, a plurality of rotary wind operated members carried by the frame member, each said wind operated member comprising a crankshaft operably connected to the wind operated member for rotation therewith, a crank arm connected to the crankshaft, the outer end thereof being offset from the rotational axis of the crankshaft, an elongated rotary power drive shaft rotatably carried by the frame member and spaced from the plurality of crankshafts of each of the wind operated members, a plurality of frictional hub members connected to the drive shaft for rotation therewith, there being one said frictional hub member associated with each crank arm of the plurality of wind operated members, a plurality of elongated flexible line members, the first end of each line member being operably connected to the outer end of a crank arm, said flexible line member being passed around one side of the associated frictional hub member and including means for yieldably securing the second end of each frictional line member.

9. A power generator system as set forth in claim 8 and including means for pivoting said elongated frame member in a horizontal plane.

10. A power generator system as set forth in claim 8 wherein each rotary wind operated member is pivotally secured to the frame member about a horizontal pivotal axis whereby said wind operated members may be individually pivoted about said horizontal pivotal axis.

11. A power generator system as set forth in claim 8 wherein the frictional hub member comprises a sheath secured to the drive shaft for rotation therewith.

12. A power generator system as set forth in claim 8 wherein the flexible line comprises a rope of woven fabric, one end thereof being attached to a crank arm for rotation therewith and an elongated pulley belt which is passed around said frictional hub member and yieldably secured and wherein the free end of said woven rope member being spreadable to accept one end of the belt member therein for gripping said belt member in tension.

* * * * *